R. R. GIBSON.
COTTON CHOPPER.
APPLICATION FILED MAR. 1, 1910.
965,888.
Patented Aug. 2, 1910.
2 SHEETS—SHEET 1.
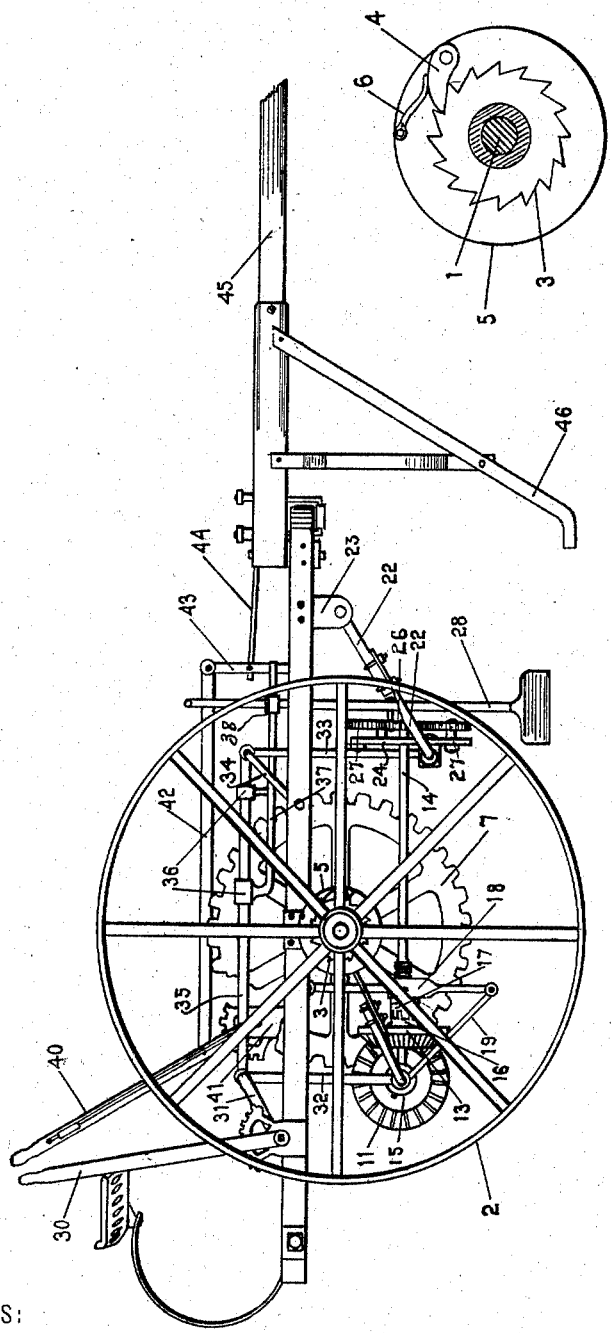
WITNESSES:
J. S. Murray
A. S. Knight
INVENTOR
Rupert R. Gibson.
BY
John M. Spellman
ATTORNEY

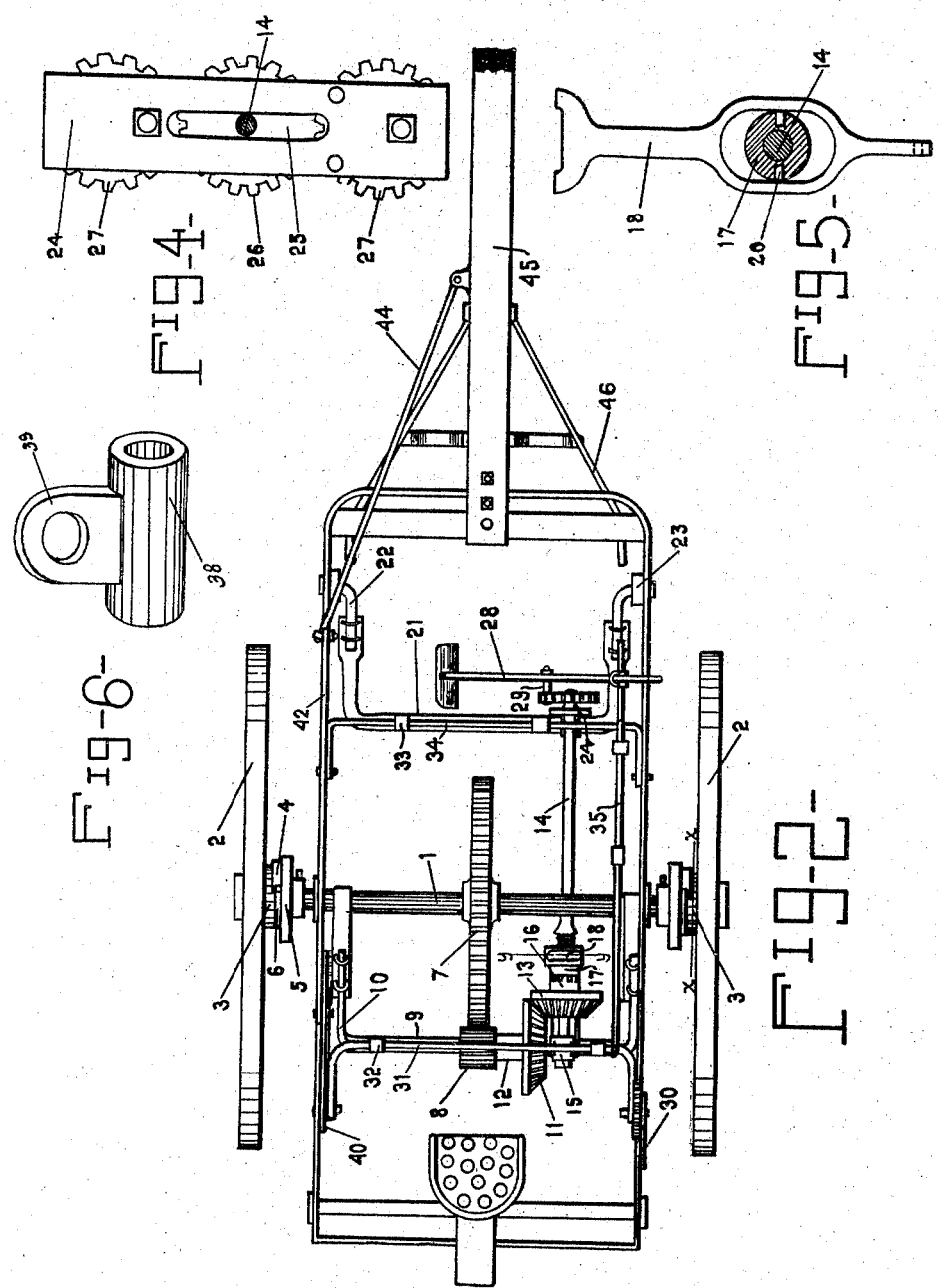

UNITED STATES PATENT OFFICE.

RUPERT R. GIBSON, OF WACO, TEXAS.

COTTON-CHOPPER.

965,888.  Specification of Letters Patent.  Patented Aug. 2, 1910.

Application filed March 1, 1910. Serial No. 546,653.

*To all whom it may concern:*

Be it known that I, RUPERT R. GIBSON, a citizen of the United States, residing at Waco, in the county of McLennan and State of Texas, have invented certain new and useful Improvements in Cotton-Choppers, of which the following is a specification.

My invention relates to new and useful improvements in cotton choppers. Its object is to provide a cotton chopper carrying hoes or cotton choppers mechanically operated from the axle of the machine, whereby rows of cotton may be expeditiously and efficiently hoed or chopped, clearing the same from weeds or other obstructions detrimental to the growth of the cotton.

Another object is to provide a cotton chopper, carrying mechanically operated hoes to which power is transmitted from the axle of the machine, the stroke of which hoes will be such as to cause their blades to transcribe an ellipse, thus covering a greater transverse area and giving greater efficiency than the circular stroke of present cotton choppers.

The object of the invention is more specifically to provide a mechanism by which said elliptical stroke will be imparted to the hoe blade.

Finally, my object is to provide a device of the character described, which will be strong, durable, simple and efficient and comparatively easy to construct, and also one in which the various parts will not be likely to get out of working order.

With these and various other objects in view my invention has relation to certain other novel features of the construction and operation, an example of which is described in the following specification and illustrated in the accompanying drawings, wherein:

Figure 1 is a side elevation of the cotton chopper complete with the exception that a portion of the large driving gear upon the axle is broken away to show the mechanism therebehind. Fig. 2 is a top view of the complete machine. Fig. 3 is a detail sectional view taken on the line x—x of Fig. 2 showing the pawl and ratchet mechanism employed to prevent operation of the cotton chopping machinery when the transporting wheels undergo reverse rotation. Fig. 4 is a detail view of a plate upon which is mounted three enmeshed gears employed to give the hoe-blade its proper stroke, the middle gear acting as a crank-wheel to operate the hoe-handle. This mechanism is specifically described hereinafter. Fig. 5 is a vertical sectional view taken on the line y—y of Fig. 2, and showing a foot-lever operating the clutch mechanism by which the cotton chopper may be thrown out of gear. Fig. 6 is a perspective view of a collar of special construction which is mounted upon a suitable rod to guide and steady the upper extremity of the hoe handle, and which is fully described hereinafter.

Referring now more particularly to the drawings wherein like numerals of reference designate similar parts in all the figures, the numeral 1 denotes the axle of the cotton chopper and 2 the transporting wheels thereof, which are loose upon each extremity of the axle. Upon the hub of each transporting wheel a ratchet wheel 3 is mounted, which is engaged by a dog 4 mounted upon a collar 5 and acted on by a spring 6. Rotation is thus communicated from the transporting wheels to the axle when the machine moves forwardly, but the axle is not caused to rotate by rearward motion of the machine.

A large gear 7 fast upon the axle 1 meshes with a pinion 8 rotatably mounted upon a circular bar 9, the upturned extremities of which are denoted by the numeral 10, and are extensible in length. A bevel gear 11 rigidly secured to the pinion 8 by a sleeve 12 engages the bevel gear 13 loose upon a shaft 14 mounted longitudinally of the machine. The rear extremity of the shaft 14 is rotatably mounted in a bearing 15 carried by the rod 9 and the forward extremity of said shaft is mounted in a special manner more fully described hereinafter. A clutch gear 16 rigidly secured to the bevel gear 13 is adapted to be engaged by a clutch gear 17 slidable upon the shaft 14 but restricted from rotation thereupon. The sliding clutch gear is operated by a foot lever 18 which engages said gear by means of pins 20 as illustrated in Fig. 5. The lower extremity of the foot lever is pivotally attached to a link 19, the other extremity of which is mounted upon the rod 9.

At the front portion of the cotton chopper is mounted a swinging bar 21, similar to the bar 9 previously described, and provided with similar extensible arms 22, the upper extremities of which are pivoted in brackets 23. A plate 24 provided with a vertical slot 25 is secured to the bar 21, being so positioned as to permit the shaft 14 to pass through said slot.

Upon the forward extremity of the shaft 14, adjacent to the plate 24, is rigidly mounted a gear 26, the upper and lower extremities of which mesh with gears 27 eccentrically mounted upon the plate 24. The gear 26 acts as a crank wheel to operate the hoe handle 28, said gear being given at the same time a reciprocating vertical motion by the eccentric rotation of the gears 27, with which it is enmeshed. The hoe handle is pivoted upon a crank-pin 29 projecting from the gear 26. Means are provided to steady the upper extremity of the hoe-handle, which means are fully described hereinafter.

In order to vertically adjust the hoe, and the swinging frame in which shaft 14 is mounted, a mechanism is provided, operated by a lever 30. This lever is rigidly mounted upon the extremity of a crank-shaped bar 31 from which a pair of links 32 extend downwardly to the bar 9. A similar pair of links 33 have their lower extremities pivotally attached to the bar 21, and their upper extremities pivoted to a crank-shaped bar 34, similar to the bar 31, and similarly pivoted in the frame of the cotton-chopper. A rod 35 is extended between the bars 31 and 34 so that when lever 30 is manipulated, a rotation of both of said bars is accomplished, causing both the front and the rear portion of the swinging hoe frame to be adjusted vertically.

A pair of sliding collars 36 mounted upon the rod 35 are rigidly attached to a rod 37, parallel to rod 35 therebeneath. A collar 38 is mounted loose upon the rod 37 and is provided with an apertured lug 39 which receives the upper extremity of the hoe-handle.

The numeral 40 designates a steering lever mounted upon a standard 41 by means of which the tongue 45 may be swung to either side of the cotton-chopper. From this lever a rod 42 extends forwardly, and is pivotally attached to the upper extremity of an arm 43, the lower extremity of which is pivoted upon the cotton-chopper frame. From the arm 43, a link 44 extends forwardly, having connection with the tongue 45 of the machine. A leg 46 attached to the tongue at each side prevents the tongue swinging downward to an extent sufficient to interfere with the proper operation of the machine.

It will be observed that the shaft 14 in conjunction with the bars 9 and 21 form a supplementary swinging frame, which is vertically adjustable. When such adjustment is made, the pinion 8 is caused to travel around the perimeter of the gear 7, continuing to mesh therewith. The arms 10 and 22 are made extensible in order that pinions of various diameters may be employed at 27 to mesh with the gear 7.

No novelty is claimed for the clutch employed to render the hoe mechanism inoperative, clutches of other construction being equally well adapted to the purpose. The pawl and ratchet mechanism, and the means provided for extension of the arms 10 and 22 might also be considerably modified without affecting the principles of operation, and various other changes are possibly in the form and proportion of parts and details. Therefore, I reserve the right to make such changes and alterations in the above described machine as fairly come within the scope of the following claims.

What I claim is:—

1. In a cotton-chopper, the combination with a main frame, an axle supporting the same and transporting wheels adapted to rotate the axle, of a supplemental frame supported from the axle and the main frame, and adapted to swing longitudinally of the machine, a longitudinally-disposed shaft rotatably mounted in the supplemental frame and forming a part thereof, mechanism communicating rotation to said shaft from the transporting wheels, a chopping hoe mounted transversely of the machine, hoe actuating means at the forward extremity of said shaft upon which the handle of said hoe is pivotally mounted, means by which a vertical reciprocating motion is imparted to the forward extremity of said shaft, and means restricting the hoe handle to motion transverse of the machine.

2. In a cotton-chopper, the combination with a main frame, an axle supporting the same and transporting wheels adapted to rotate the axle, of a supplemental frame supported from the axle and the main frame and adapted to swing longitudinally of the machine, a longitudinally-disposed shaft rotatably mounted in the supplemental frame and forming a part thereof, mechanism communicating rotation to said shaft from the transporting wheels, a plate mounted at the forward part of the supplemental frame provided with a vertical slot through which the said shaft projects, a gear mounted fast upon said shaft adjacent to said plate, a pair of gears mounted eccentrically upon said plate meshing with the top and bottom of said gear, a hoe, the handle of which is eccentrically pivoted upon said gear, and means restricting the hoe-handle to a motion transverse of the machine.

In testimony whereof I have signed my name to this specification in the presence of two subscribing witnesses.

RUPERT R. GIBSON.

Witnesses:
B. F. NEWBERY,
MILES H. COOK.